United States Patent

Sawaguchi

[19]

[11] Patent Number: 5,971,283
[45] Date of Patent: Oct. 26, 1999

[54] STEREO CODE

[75] Inventor: Takashi Sawaguchi, Tokyo, Japan

[73] Assignee: Tatsuji Mizobe, Chiba, Japan

[21] Appl. No.: 09/002,004

[22] Filed: Dec. 31, 1997

[30] Foreign Application Priority Data

Feb. 14, 1997 [JP] Japan ................................... 9-30366

[51] Int. Cl.$^6$ ............................. G06K 19/06; G06K 7/10
[52] U.S. Cl. ........................................................... 235/494
[58] Field of Search .................................. 235/494, 487, 235/454, 449

[56] References Cited

U.S. PATENT DOCUMENTS

| | | | |
|---|---|---|---|
| 3,916,160 | 10/1975 | Russo et al. | 235/494 |
| 4,874,936 | 10/1989 | Chandler et al. | 235/494 |
| 4,924,078 | 5/1990 | Sant'Anselmo et al. | 235/494 |
| 5,202,552 | 4/1993 | Little et al. | 235/494 |
| 5,245,165 | 9/1993 | Zhang | 235/454 |
| 5,288,986 | 2/1994 | Pine et al. | 235/494 |
| 5,507,527 | 4/1996 | Tomioka et al. | 235/494 X |
| 5,814,801 | 9/1998 | Wang et al. | 235/454 |
| 5,874,718 | 2/1999 | Matsui | 235/494 |

*Primary Examiner*—Donald Hajec
*Assistant Examiner*—Drew A. Dunn
*Attorney, Agent, or Firm*—Liniak, Berenato, Longacre & White

[57] ABSTRACT

A stereo code which can display a large amount of information on a small area without impairing the beauties of the goods etc. is provided, the stereo code comprising: a first stage information displaying region as a basic shape, comprising an inlaying body made up of a first rectangle having a prescribed area and displaying code information, and an inlaid body which is a second rectangle having an area half the first rectangle placed such that each intersection point of each two side constructing the inlaid body is internally touched with each side of the inlaying body, and displaying optically or magnetically readable code information based on the reflection of an irradiated light or magnetic force of a magnetic substance applied on the regions of four corners formed by surrounding the inlaid body by the inlaying body; and a second stage information displaying region comprising an inlaying body which is the inlaid body of the first stage and an inlaid body internally touched with the inlaying body, a third stage information displaying region comprising an inlaying body which is the inlaid body of the second stage and an inlaid body internally touched with the inlaying body, and similarly an n th stage information displaying region comprising an inlaying body which is the inlaid body of the previous stage and an inlaid body internally touched with the inlaying body.

5 Claims, 7 Drawing Sheets

STEREO CODE

BACKGROUND OF THE INVENTION

1. Field of the Invention

This invention relates to a method for displaying code used for code information such as merchandise management in POS (point of sales) system, the classification of baggage and prepaid card.

2. Prior Art

In conventional, so-called bar code is used in many cases for the merchandise management described above. In the bar code, 13 kinds of numeric codes are displayed by 4 kinds of lines and blank space, and the numeric codes display the name of country produced, the name of maker, the item of goods. However, the information which can displayed by the bar code is little and printing of the bar code requires high printing accuracy. Moreover, it is impossible to print the bar code in a small space. Consequently, so-called Karura code has been suggested in which a square is divided into four equal parts along the cross lines, and the four divided squares are painted in 16 manners to thereby display the numeric codes from 0 to 15, and has been partly popularized. The Karura code can increases an amount of information which can be displayed by arranging two or more squares, but the increase in an amount of information has problematic as in the bar code in terms of the increasing the area to be displayed.

SUMMARY OF THE INVENTION

The present invention has been made in order to solve the problems described above, and the object of the present invention is to provide a method for displaying a stereo code which can be read by an optically or magnetically reader and can display a large amount of information in a small displaying area.

The present invention relates to a stereo code, which displays prescribed code information on a first or n-stage information displaying region, the stereo code comprising: a first stage information displaying region as a basic shape, comprising an inlaying body made up of a first rectangle having a prescribed area and displaying code information, and an inlaid body which is a second rectangle having an area half the first rectangle placed such that each intersection point of each two side constructing the inlaid body is internally touched with each side of the inlaying body, and displaying optically or magnetically readable code information based on the reflection of an irradiated light or magnetic force of a magnetic substance applied on the regions of four corners formed by surrounding the inlaid body by the inlaying body; a second stage information displaying region comprising an inlaying body which is the inlaid body of the first stage and an inlaid body internally touched with the inlaying body, a third stage information displaying region comprising an inlaying body which is the inlaid body of the second stage and an inlaid body internally touched with the inlaying body, and similarly an n th stage information displaying region comprising an inlaying body which is the inlaid body of the previous stage and an inlaid body internally touched with the inlaying body.

Further, the features of the present invention reside in that the optically or magnetically readable code information is displayed on each region formed by surrounding each side of the inlaid body and two diagonal lines, that the code information displayed on each of the region in an optically readable manner is carried out by the black or white coloration of the region as white binary data, and that the code is displayed by expressing a pattern which expresses optically readable prescribed code information on the region having been colored as black and white binary data.

BRIEF DESCRIPTION OF THE DRAWINGS

FIGS. 9 (a) to (d) are drawings showing an example where different codes are displayed on the same region;

FIGS. 11 (a) and (b) is a drawing showing an example in which code displaying is carried out by the use of black and white in combination with a pattern, wherein the symbols have the following meanings:

| K . . . | Stereo Code, | 1 . . . Basic shape, |
|---|---|---|
| 2 . . . | Inlaying body, | 3 . . . Inlaid body, |
| 2a . . . | Upper side of rectangle, | 5 . . . Inlaid body, |
| 4 . . . | Inlaying body, | 7 . . . Inlaid body, |
| 6 . . . | Inlaying body, | 9 . . . Inlaid body, |
| 8 . . . | Inlaying body, | |
| a1, a2, a3, a4 . . . | Regions, | |
| b1, b2, b3, b4 . . . | Regions, | |
| e1, e2, e3, e4 . . . | Regions. | |

PREFERRED EMBODIMENTS OF THE INVENTION

Figure 1:
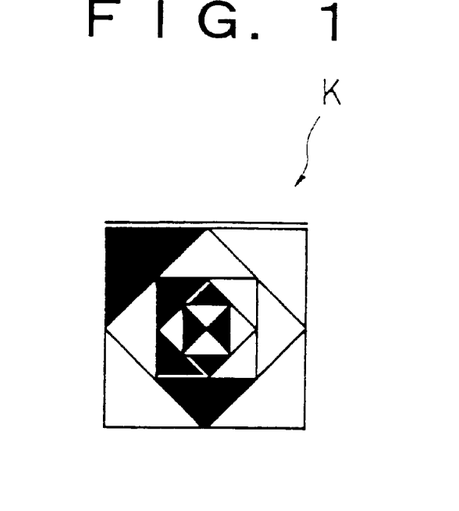
FIG. 1 is a drawing showing example of the stereo code according to the present invention.
Figure 2:
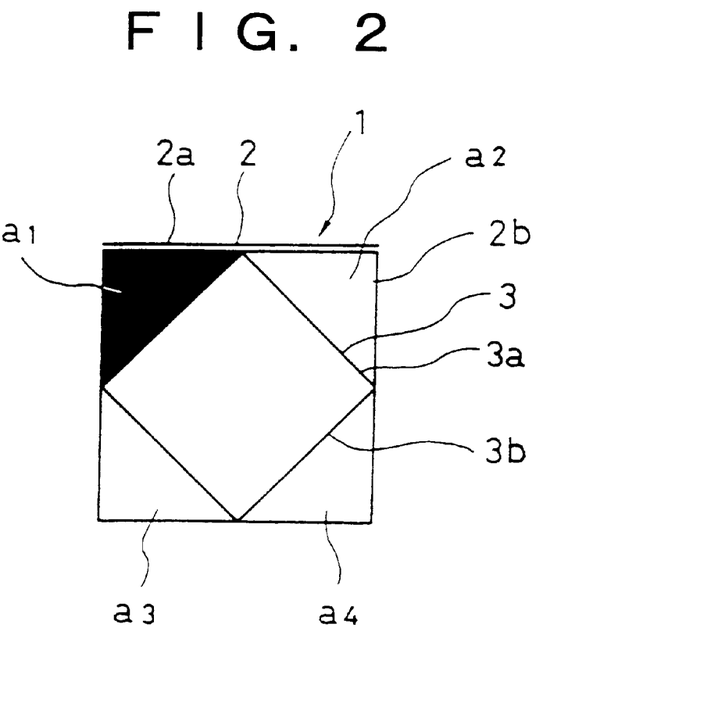
FIG. 2 is a drawing showing a basic shape of the stereo code.

One embodiment of the present invention will now be described with reference to attached drawings. FIG. 1 shows one example of the stereo code according to the present invention. In this stereo code K, several squares are combined in multiple stages, and are colored black or white as binary data which can be read optically or magnetically to express a prescribed code. Hereinafter, the code in this case will be described. FIG. 2 shows a basic shape for displaying the stereo code K. This basic shape 1 is composed of a rectangle inlaying body 2 having a rectangle inlaid body 3 internally touched, i.e., inlaid therein. The inlaid body 3 to be internally touched has similarity to the inlaying body 2 and has an area half the inlaying body 3. The cross point of two sides of the four sides constructing the inlaid body is internally touched with the corresponding side of the inlaying body 3. In the example shown in the figure, the cross points are internally touched with the corresponding sides (2a, 2b . . . ) of the inlaying body 2 in an approximately middle portion, but the manner of the touching is not restricted thereto as long as the inlaid body 3 is internally touched so that regions a1 to a4 are formed.

The regions a1 to (a4) which are formed by being surrounded by the inlaying body 2 and inlaid body 3 are colored black or white as binary data which can optically or magnetically read to thereby display code information. In this embodiment, by the black coloration of one or more region (s), for example, decimal code information, i.e., 0–9, is displayed. Although, this will be described in detail below, in case of the example shown in the figure, numerical 1 in the decimal method is displayed by black coloration of the region (a1). Conversely, the region (a1) may be a white blank, i.e., may be colored white to have information. When the upper side 2a of the rectangle constructing the inlaying body 2 is expressed as double lines, top and bottom of the basic shape may be represented. Otherwise, either of right and left sides of the rectangle may be expressed as double lines to clarify the right and left position. In any case, by expressing any of the four sides as double lines, the position of top and bottom or right and left is expressed.

Figure 3:
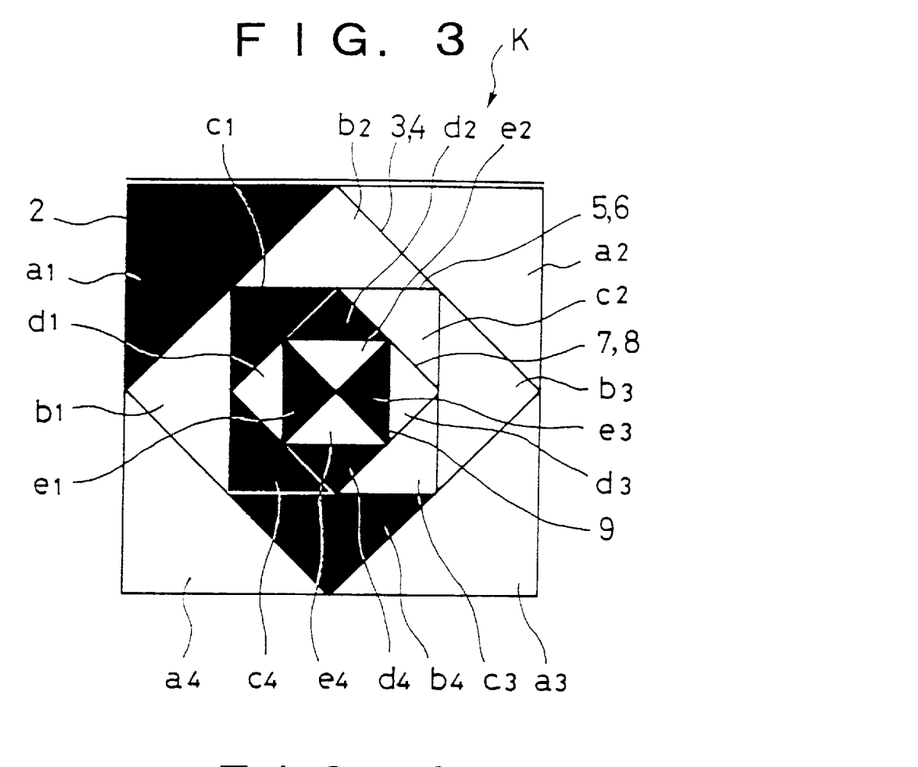
FIG. 3 is a drawing showing a stereo code in which the information displaying regions are set in a multi stage.

FIG. 3 shows a stereo code K wherein the information displaying regions are constructed as multiple stages. In this example, the basic shape 1 as described as is constructed as the information displaying region of the first stage, and the second stage information displaying regions are formed by using the inlaid body 3 in the first stage as an inlaying body 4, and internally touching an inlaid body 5. Code information is displayed by black or white coloration of the regions (b1), (b2), (b3), and (b4) as binary data. Subsequently, the third stage information displaying regions are formed by using the inlaid body 5 in the second stage as an inlaying body 6, and internally touching an inlaid body 7. Code information is displayed by black or white coloration of the regions (c1), (c2), (c3), and (c4) as binary data. Furthermore, fourth stage information displaying regions are formed by using the inlaid body 7 in the third stage as an inlaying body 8, and internally touching an inlaid body 9. Code information is displayed by the black or white coloration of the regions (d1), (d2), (d3), and (d4) as binary data.

As described above, in this embodiment, the code information is displayed through the four-stage information displaying regions. The code information is displayed by the black or white coloration of the regions (e1), (e2), (e3), and (e4), which are produced by surrounding the sides constructing the rectangle and the two diagonal lines, as binary data (described later), and these are determined to be the final-stage information displaying regions. By the sectioning the part through the diagonal lines, it is easy to optically read that the information-displaying regions are the final-stage.

Figure 4:
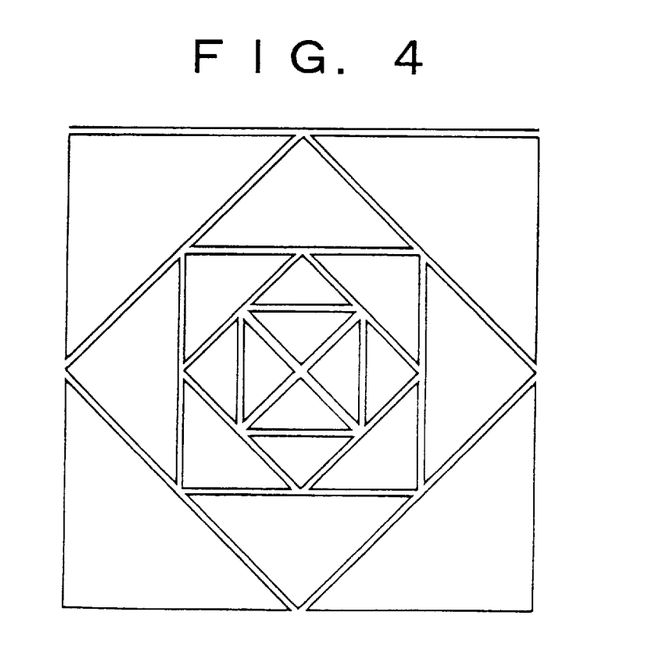
FIG. 4 is a drawing showing an example of the stereo code in which a sectioning line which sections each region is displayed as double lines.

FIG. 4 shows a drawing showing an example of the stereo information in which the sectioning lines which section the regions are expressed as double lines. To be specific, the sectioning lines which section the regions (a1) to (a2) and (b1) to (b4) as shown in FIG. 3 above are expressed as double lines. By expressing each of the regions sectioned by the double lines, for example, it is possible that when a security code is set by each individual, a design of the stereo code where no region is colored black or white as shown in FIG. 4 is ready and one colors the design black or white so as not to be stuck out from the line to set a code to be desired by oneself.

Figure 5:
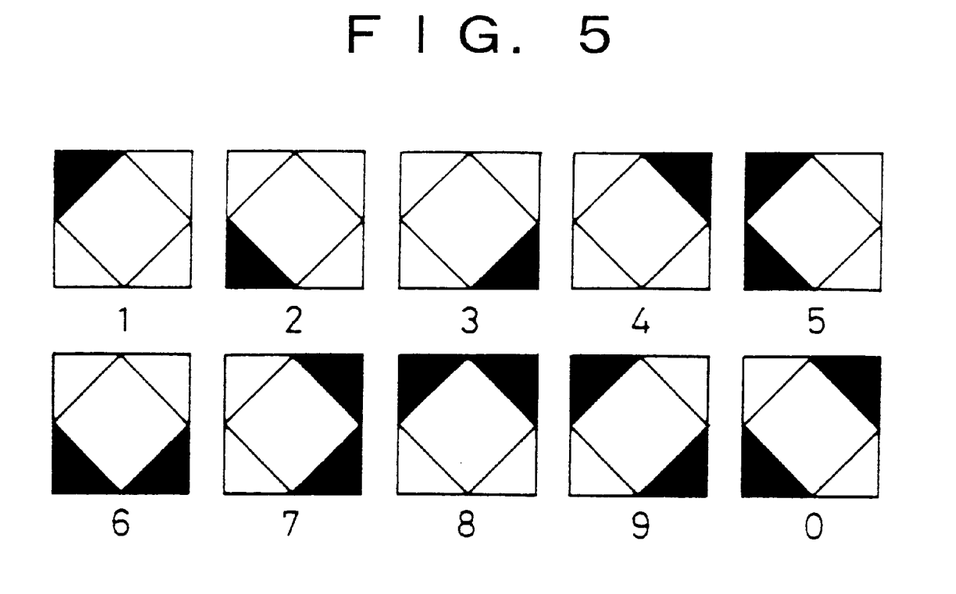
Figure 6:
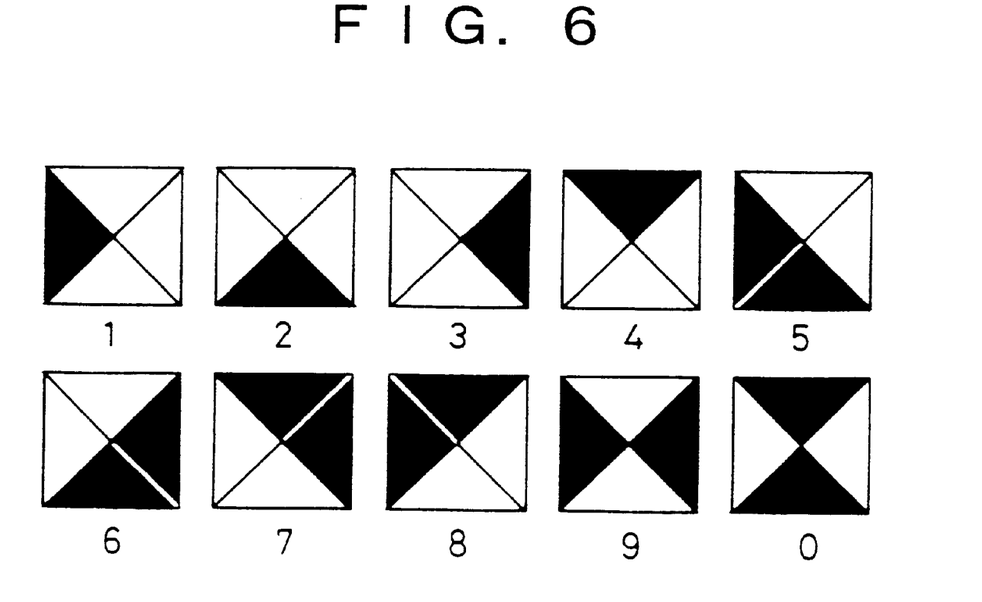
FIG. 6 is a drawing showing an example of the assignment of code in each information displaying region.

FIG. 5 shows a drawing showing one example of assignment of the code in each information displaying region. When this example is described by the use of symbols shown in FIG. 2, [1] in the decimal method is expressed by the black coloration of the upper left region (a1), and [2] in the decimal method is expressed by the black coloration the lower left region (a3). Similarly, the coloration of the regions (a1) and (a3) expresses [5] in the decimal method and the coloration of the regions (a2) and (a4) expresses [7] in the decimal method. In the stereo code K as shown in FIG. 1 above, the code displaying in the information-displaying regions from the first stage to the fourth stage expresses [1, 2, 5, 0], or vice versa when encoding in the reverse direction, the expression means [0, 5, 2, 1]. FIG. 6 is a drawing showing the assignment of code in the information displaying regions in the final stage, and the information is displayed in such a manner that one or two region(s) sectioned by the two diagonal lines is (are) colored black. The stereo code K as shown in FIG. 1 finally expresses [1, 2, 5, 0, 9] and when encoding from the reverse direction, it expresses [9, 0, 5, 2, 1].

Figure 7:
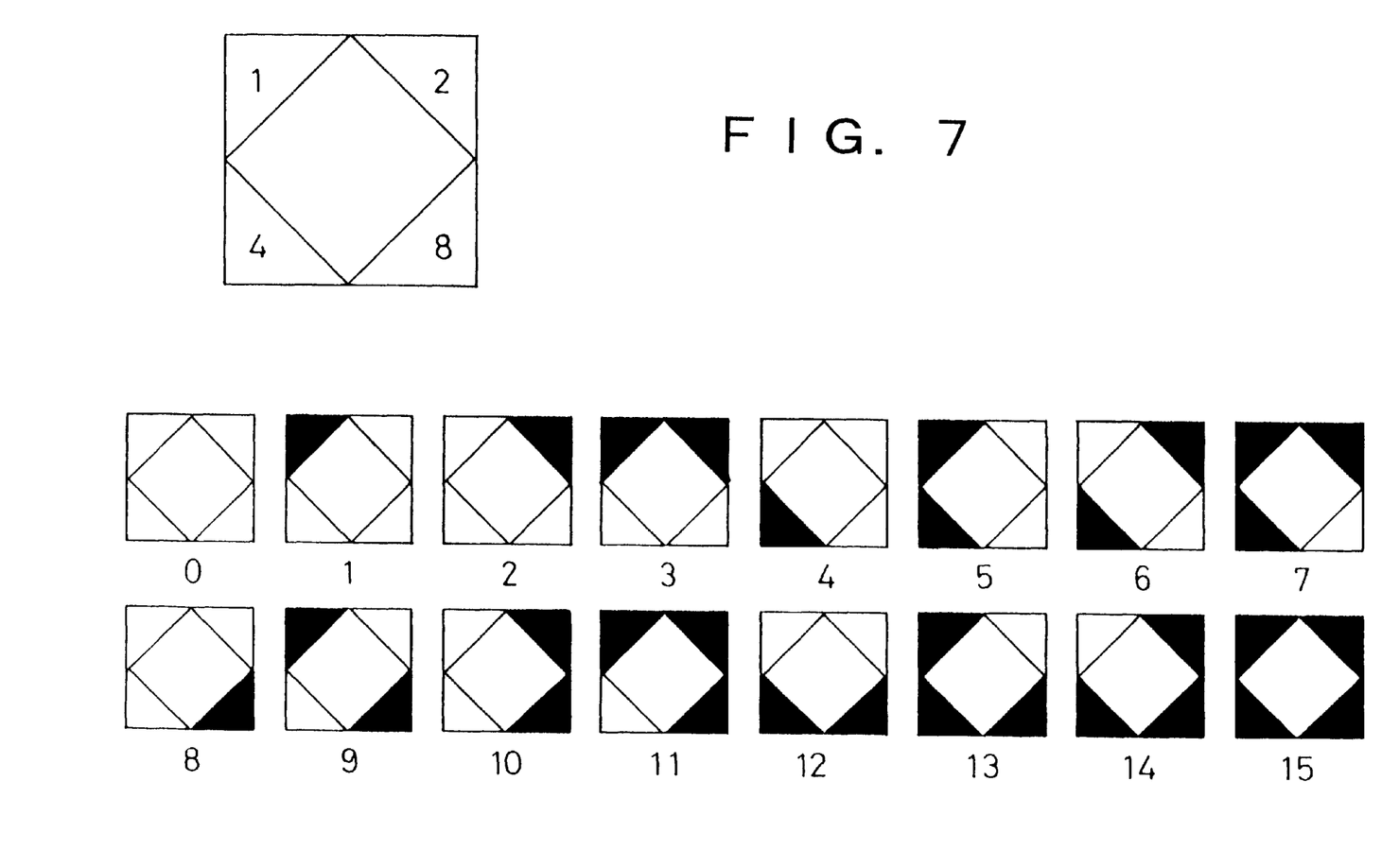
FIG. 7 is a drawing showing an example of the assignment of code in each information displaying region in the final stage.
Figure 8:
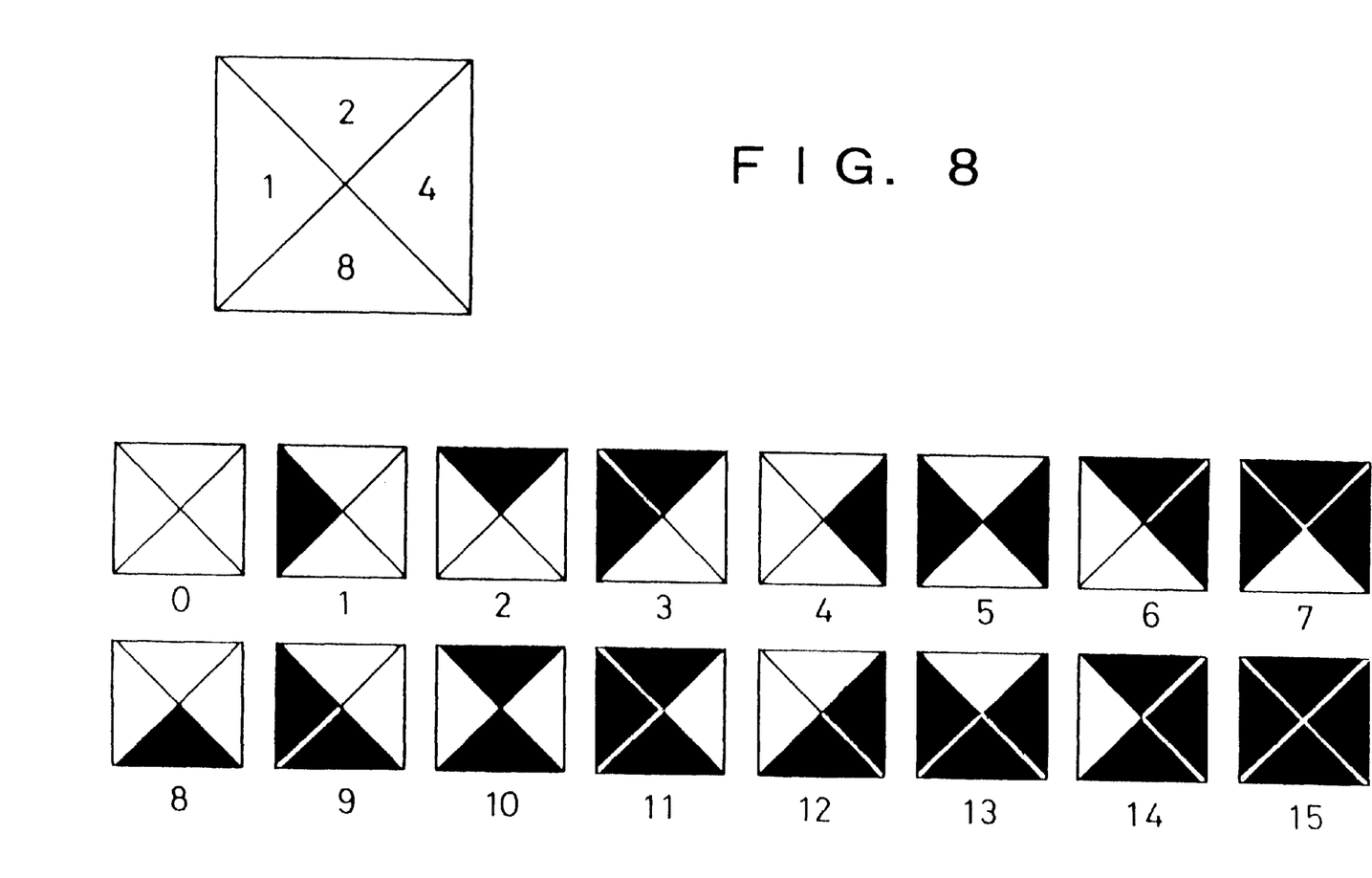
FIG. 8 is a drawing showing another example of the assignment of code in each information displaying region in the final stage.

As shown in FIGS. 5 and 6, when 10 codes from 0 to 9 are assigned in each information displaying regions, the amount of information in the two stage displaying regions is $10^2$, that in the three stage is $10^3$, and that in n-stage information displaying regions is $10^n$. Since the stereo code shown in FIG. 1 has five stages, one this stereo code can display one million ways of information. When the code expresses in a binary scale as shown in FIGS. 7 and 8, much more information can be displayed. For example, in the case of the stereo code displayed in the five stages, $16^5$, i.e., over one million, codes can be displayed. Consequently, for example in the case where the amount of the final information is unclear in advance, for the time being, the codes from 0 to 9 are assigned on each regions. If the code is lacking, the displaying of the region is changed into binary scale of from 0 to 15 without changing the displaying of the stereo code, to thereby sharply increase the amount of information displayed. Of course, code displaying can be in 4-ary scale, octal scale, or hexadecimal scale.

Figure 9:
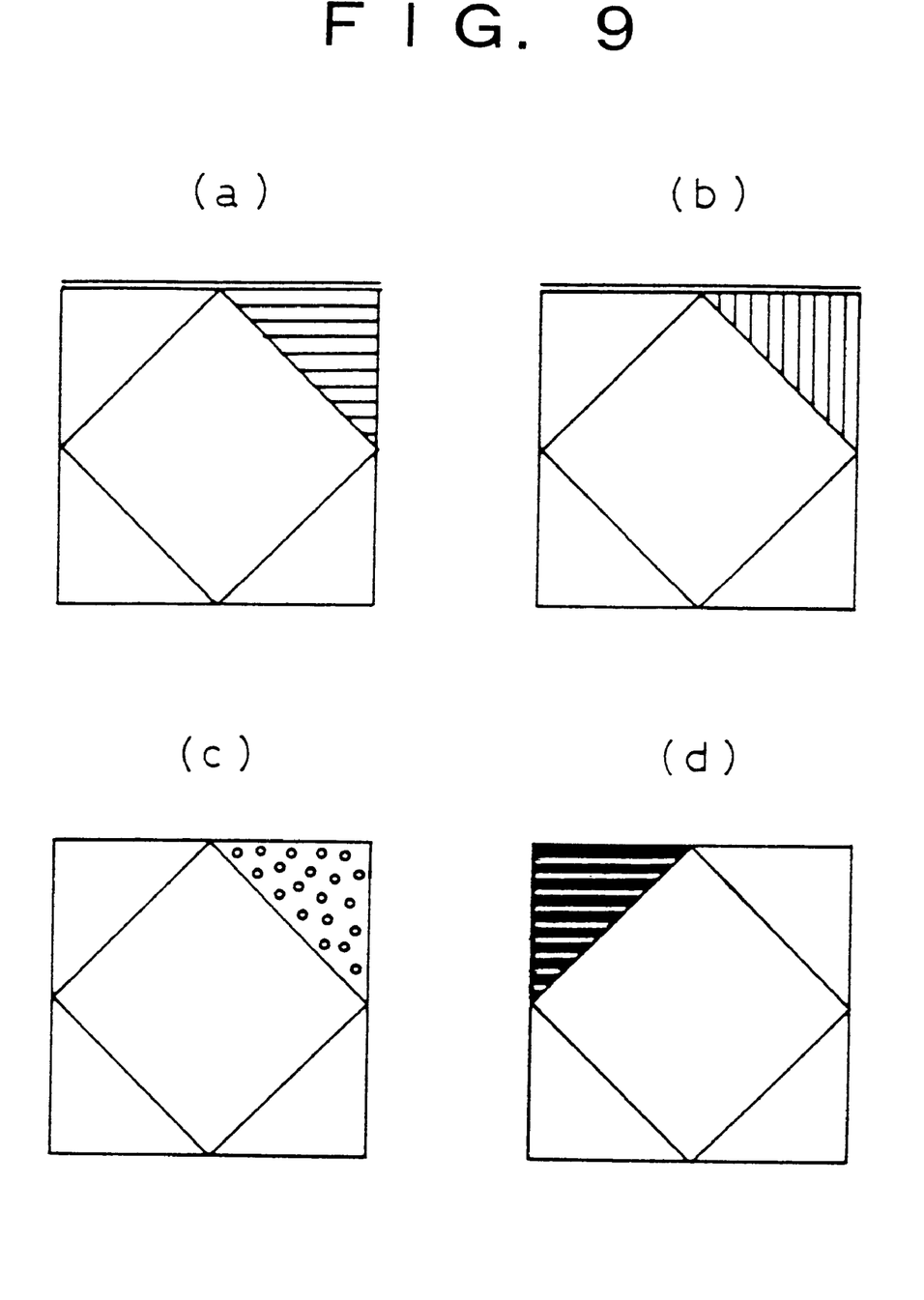
Figure 10:
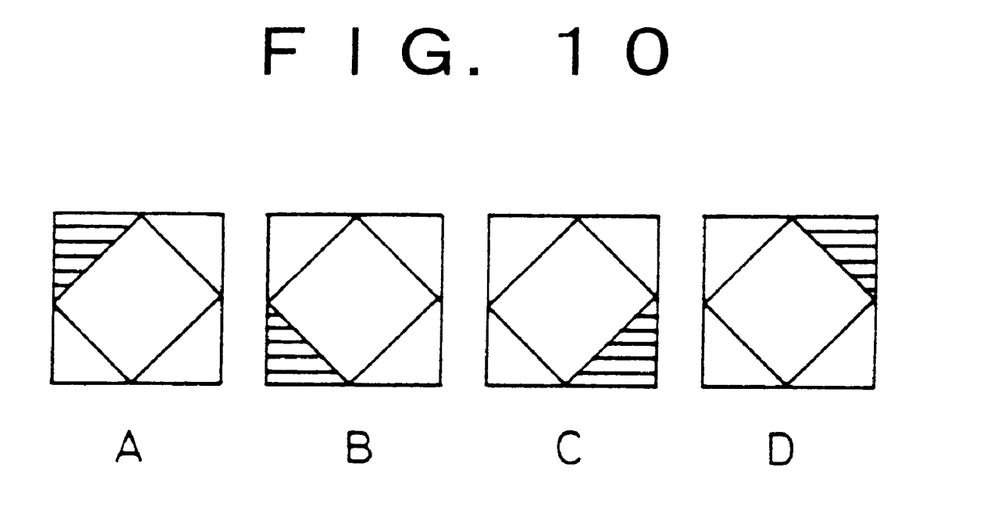
FIG. 10 is an drawing showing an example of code displaying by the use of a pattern.
Figure 11:
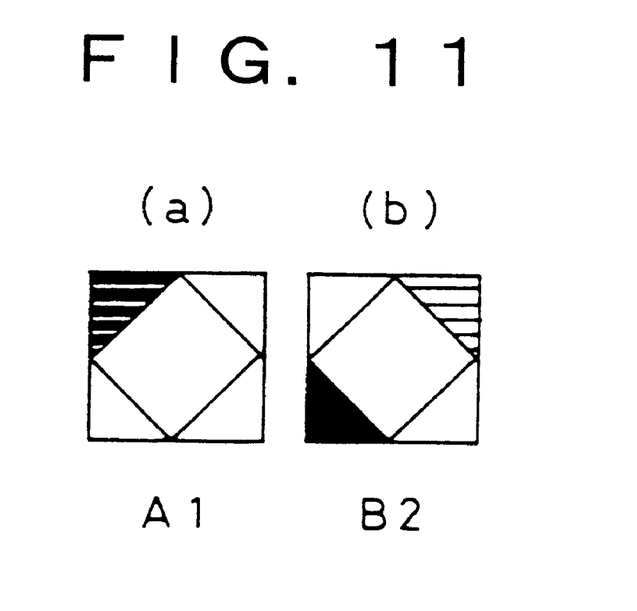

FIGS. 9 (a) to (d) show an example displaying the different codes in the same region. When different codes are displayed on the same region, patterns such as horizontal lines [FIG. (a)], longitudinal lines [FIG. 9 (b)], and polka dots [FIG. (c)] may be added to be distinguished from black and white coloration. These patterns can be displayed overlapping with the black and white coloration. As shown in FIG. 9 (d), the patterns can be displayed on the region where code information is set by black coloration. In this case, the patterns in white color are placed on the black background. FIG. 10 shows one example of code displaying using a pattern. In this example, a strip pattern is placed on each image displaying region to display [A] to [D]. FIG. 11 shows code displaying using a combination of black and white with a pattern. For example, FIG. 11 (a) displays [A1] and FIG. 11 (b) displays [B2]. Although the inlaid body in the final stage of the information displaying region shown in FIG. 6 is not specially shown, a code can be displayed by the use of a pattern such as horizontal lines longitudinal lines, polka dots, a letter, an animal or an plant in combination with black and white. As for the black or white coloration described above, the colors to be distinguished is not specifically restricted to the combination of black with white as long as two patterns can be optically read, and , for example, a combination of red with blue or of yellow with green can be utilized.

In the embodiments described above, the stereo code is produced as optically readable code. However, it is also possible that a magnetic ink is printed on the stereo code to record code information on the region due to the presence or absence of the application of magnetic ink instead of painting of black or white. Otherwise, the stereo code described above where code is assigned is recorded on a recording media such as a magnetic tape or a floppy disk as an image data. This data can be read by a reader having a magnetic head. Alternatively, a stereo code in which painting of black or white has beer carried out but no code is assigned is recorded on the magnetic recording tape etc. described above, which is then read by a reader. A code is assigned to read the stereo code to perform various information treatments, for example, in the case of setting a security code.

As described above, in the present invention, the stereo code is composed of a first stage information displaying region as a basic shape, comprising an inlaying body made up of a first rectangle having a prescribed area and displaying code information, and an inlaid body which is a second rectangle having an area half the first rectangle placed such that each intersection point of each two side constructing the inlaid body is internally touched with each side of the inlaying body, and displaying optically or magnetically readable code information based on the reflection of an irradiated light or magnetic force of a magnetic substance applied on the regions of four corners formed by surrounding the inlaid body by the inlaying body; a second stage information displaying region comprising an inlaying body which is the inlaid body of the first stage and an inlaid body internally touched with the inlaying body, a third stage information displaying region comprising an inlaying body which is the inlaid body of the second stage and an inlaid body internally touched with the inlaying body, and similarly an n th stage information displaying region comprising an inlaying body which is the inlaid body of the previous stage and an inlaid body internally touched with the inlaying body. By such a construction, a large amount of information can be displayed in a small area and, thereby, the method of the stereo code suitable for merchandise management in POS system and classification of baggage, and for displaying code information e.g., in prepaid card and displaying various security codes can be provided without impairing the beauties of the goods etc.

What is claimed is:

1. A stereo code, which displays prescribed code information on a first or n-stage information displaying region, the stereo code comprising:

a first stage information displaying region as a basic shape, comprising a first inlaying body made up of a first rectangle having a prescribed area and displaying code information, and a first inlaid body which is a second rectangle having an area half the first rectangle placed such that each intersection point of each two sides constructing the first inlaid body is internally touched with each side of the first inlaying body, and displaying optically or magnetically readable code information based on the reflection of an irradiated light or magnetic force of a magnetic substance applied on the regions of four corners formed by surrounding the first inlaid body by the first inlaying body; and a second stage information displaying region comprising a second inlaying body which is the first inlaid body of the first stage and a second inlaid body internally touched with the second inlaying body, a third stage information displaying region comprising a third inlaying body which is the second inlaid body of the second stage and a third inlaid body internally touched with third inlaying body, and similarly an n th stage information displaying region comprising an n th inlaying body which is the inlaid body of the previous stage and an n th inlaid body internally touched with the n th inlaying body.

2. The stereo code as claimed in claim 1, wherein one side of the rectangle of the inlaying body forming the basic shape is expressed as a bold line or double lines to express the top and bottom or right and left of the stereo code.

3. The stereo code as claimed in claim 1, wherein the optically or magnetically readable code information is displayed on each region formed by surrounding each side of the inlaid body and two diagonal lines.

4. The stereo code as claimed in claim 1, wherein the code information displayed on each of the region in an optically readable manner is carried out by black or white coloration of the region as binary data.

5. The stereo code as claimed in claim 4, wherein the code is displayed by expressing a pattern which expresses optically readable prescribed code information on the region having been colored as black and white binary data.

* * * * *